C. W. NIVALA.
GRUBBING MACHINE.
APPLICATION FILED JUNE 5, 1915.
1,203,040.
Patented Oct. 31, 1916.
2 SHEETS—SHEET 1.
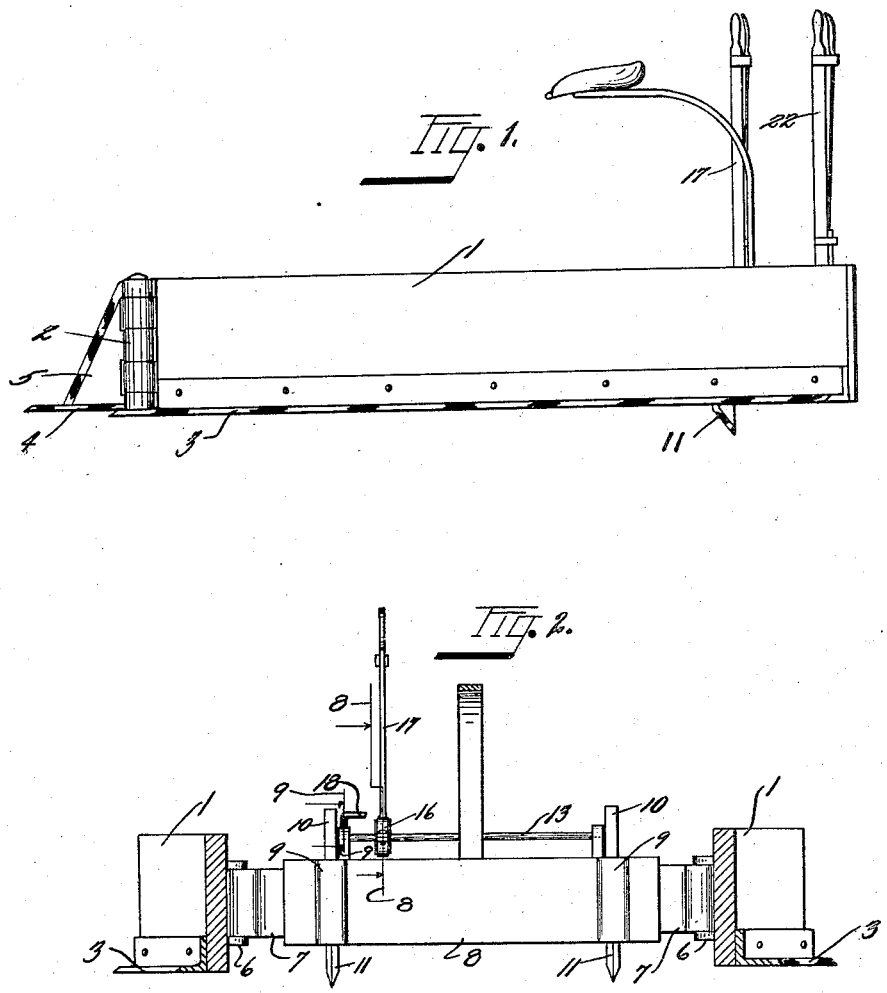

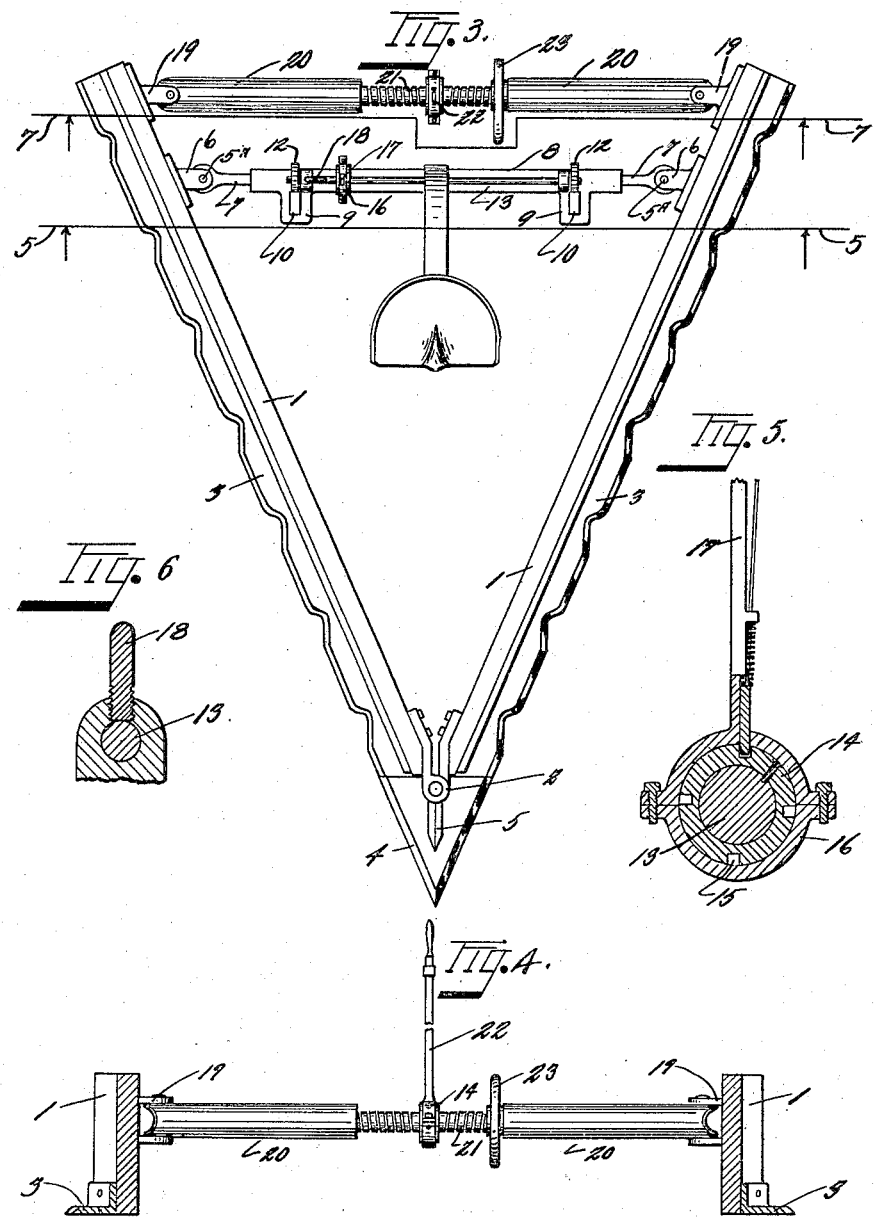

UNITED STATES PATENT OFFICE.

CHARLES W. NIVALA, OF RED LODGE, MONTANA.

GRUBBING-MACHINE.

1,203,040.  Specification of Letters Patent.  Patented Oct. 31, 1916.

Application filed June 5, 1915.  Serial No. 32,323.

*To all whom it may concern:*

Be it known that I, CHARLES W. NIVALA, a citizen of the United States, residing at Red Lodge, in the county of Carbon and State of Montana, have invented certain new and useful Improvements in Grubbing Machines, of which the following is a specification.

This invention relates to improvements in sage-brush-grubbing machines and its object is to construct a machine of this character which will adapt itself to all irregularities of the ground and that will cleanly cut all brush at a point just above ground level and that will at the same time sever the roots below the surface of the ground thus insuring a thorough removal and weeding out of the troublesome growth. The shape of the machine is such that the cut and uprooted vegetable matter will be lined up in rows thereby at the sides of the machine in such manner that it is easily gathered.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a side view of the machine. Fig. 2 is a cross section taken on line 5—5 of Fig. 6. Fig. 3 is a plan view of the machine. Fig. 4 is a cross section taken on line 7—7 of Fig. 6 to illustrate the frame adjusting mechanism. Fig. 5 is a section taken on line 8—8 of Fig. 2. Fig. 6 is a section on line 9—9 of Fig. 2.

Like reference characters indicate corresponding parts throughout the several views.

The reference numeral 1 designates a V-shaped frame the sides of which are united by the hinge 2. The sides of the frame are provided with the scalloped blades 3 and the apex of the frame with the blade 4 which rests upon and projects ahead of the said blades 3 and said blade 4 is connected by a standing blade 5 with the said hinge 2. The rear portions of the frame 1 are provided with oppositely disposed pivots 5ª carried by brackets 6 and upon said pivots the links 7 are arranged that telescope into the ends of the brace 8 which is formed with guides 9, 9 in which racks 10 are arranged, that are connected to the blades 11, in engagement with pinions 12 terminally carried by the transverse rotary shaft 13 which is provided with and made fast to the collar 14 formed with recesses 15; about the collar 14 a clamp 16 is loosely disposed which clamp carries a lever 17 adapted for engagement with said collar 14 whereby the same may be rotated together with the shaft 13. A screw 18 carried by one of the bearings of shaft 13 serves to lock the same against rotation when desired.

To the rear ends of the frame 1 brackets 19 are secured that carry sleeves 20 which are threaded interiorly to receive the ends of a telescoping screw 21. the ends of which are reversely threaded with respect to each other, which carries and is operable by the hand lever 22 whereby said sleeves 20 may be moved toward or away from each other to move the sides of the frame 1 inwardly or outwardly as desired. A hand wheel 23 carried by screw 21 serves to retain said screw in adjusted position.

What is claimed is:—

1. In a grubbing machine, a V-shaped frame having its sides hinged together at its apex, oppositely disposed pivots carried by said frame, a transversely extending brace, links carried by said pivots and telescopically engaging said brace, oppositely disposed transversely extending sleeves pivotally carried at the rear end of said frame, said sleeves being threaded interiorly, a screw having its ends reversely threaded with respect to each other telescopically engaging the threaded portions of said sleeves, means for imparting motion to said screw whereby uniform movement of said sleeves is possible and means for locking said screw in adjusted position with relation to said sleeves.

2. In a grubbing machine, a V-shaped frame having its sides hinged together at its apex, horizontally extending blades secured to the base of said frame, transversely extending sleeves connecting the free ends of said frame, manually operable means telescopically engaging said sleeves whereby they may be moved toward or away from each other and means carried by said sleeves for releasably locking them in an adjusted position.

In testimony that I claim the foregoing as my own I have hereto affixed my signature in the presence of two subscribing witnesses.

CHARLES W. NIVALA.

Witnesses:
EMIL HUKKILA,
R. G. WIGGENHORN.